(12) United States Patent
Sassoon

(10) Patent No.: US 8,052,313 B2
(45) Date of Patent: Nov. 8, 2011

(54) COMBINATION LED LAMP

(76) Inventor: Charles I. Sassoon, Kings Point, NY (US)

(*) Notice: Subject to any disclaimer, the term of this patent is extended or adjusted under 35 U.S.C. 154(b) by 115 days.

(21) Appl. No.: 11/529,962

(22) Filed: Sep. 29, 2006

(65) Prior Publication Data

US 2008/0080199 A1  Apr. 3, 2008

(51) Int. Cl.
*F21S 8/10* (2006.01)
*F21V 21/00* (2006.01)

(52) U.S. Cl. ......... 362/545; 362/487; 362/540; 362/800

(58) Field of Classification Search .......... 362/487, 362/498–499, 540–545, 800
See application file for complete search history.

(56) References Cited

U.S. PATENT DOCUMENTS

| 6,520,669 | B1 * | 2/2003 | Chen et al. ............ 362/545 |
| 6,623,150 | B2 * | 9/2003 | Roller et al. ........... 362/520 |
| 6,897,771 | B1 * | 5/2005 | Lodhie et al. .......... 340/479 |
| 2006/0044818 | A1 * | 3/2006 | Amagasa ............... 362/514 |

* cited by examiner

*Primary Examiner* — Jason Moon Han
(74) *Attorney, Agent, or Firm* — Stroock & Stroock & Lavan LLP

(57) ABSTRACT

The present invention relates to a combination lamp which combines at least two different lamp components in a unitary configuration, preferably reducing the total amount of space taken up for the same amount of illumination produced. The combination lamps are preferably suitable for use on vehicles, light fixtures, lamps, decorative articles, etc., and each lamp component preferably has a power connection element independent from the other lamp components.

10 Claims, 4 Drawing Sheets

COMBINATION LED LAMP

BACKGROUND OF THE INVENTION

1. Field of the Invention

The present invention relates to lamps having light-emitting diode (LED) light sources, for example, light fixtures and lamps such as free standing lamps, lamps for vehicles, etc. More particularly, the present invention relates a combination of one or more LED lamps, more specifically a combination back-up and stop/turn/tail lamp of a vehicle.

2. Description of Related Art

Multiple lamps are often used to illuminate a common area, either in combination or in an alternating fashion. For example, a room can have light fixture such as fluorescent lighting which illuminates the entire room when on, and provides no light when it is off. In addition, the room can have atmosphere lighting which provides a dim illumination. Similarly, the rear of a vehicle can have back-up lamps, which light up when the vehicle is being moved in reverse, as well as stop/tail/turn lamps which light up when the driver brakes, signals to turn, or turns on the headlights. These lamps are typically adjacent to each other, and most vehicles have two of each lamp, one on either side of the rear of the vehicle, above the rear bumper. In certain vehicles, such as trucks, it is common to have more than two of the back-up lamp and/or the stop/tail/turn lamp to provide brighter illumination.

Accordingly, there is a need to provide a device that can combine two or more lamps in a unitary configuration which provide at least substantially the same illumination as the individual lamps.

SUMMARY OF THE INVENTION

The present invention relates to a combination lamp which combines at least two different lamp components in a unitary configuration, preferably reducing the total area taken up while providing at least the same amount of illumination produced. The combination lamps are preferably suitable for use on vehicles, light fixtures, lamps, decorative articles, etc.

In one embodiment of the invention, the combination lamp includes a stop/turn/tail lamp surrounded by a flange for installation onto a vehicle, wherein the stop/tail/turn lamp and the flange each have a separate set of light sources, preferably light emitted diodes (LEDs). The LEDs of the flange are preferably activated when the vehicle backs up, thus performing as a back-up lamp. In a preferred embodiment of the invention, the stop/tail/turn lamp and the back-up lamp have separate power plugs connected to the vehicle in such a way that the stop/tail/turn lamp turns on when the driver signals, brakes, or when the headlights are on, and the back-up lamp turns on when the vehicle is backing-up, and not vice-versa.

Other objects and features of the present invention will become apparent from the following detailed description, considered in conjunction with the accompanying drawing figure. It is to be understood, however, that the drawings are designed solely for the purpose of illustration and not as a definition of the limits of the invention, for which reference should be made to the appended claims.

BRIEF DESCRIPTION OF THE DRAWINGS

The particular features and advantages of the invention as well as other objects will become apparent from the following description taken in connection with the accompanying drawings, in which.

DESCRIPTION OF EXEMPLARY EMBODIMENTS

Figure 1:
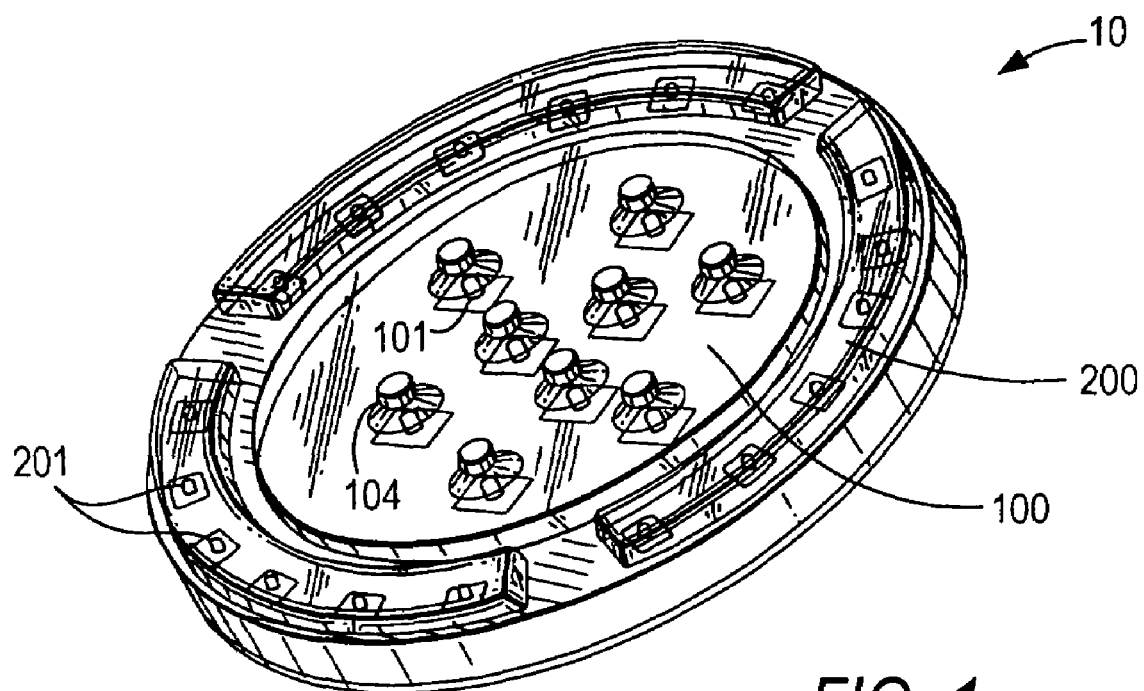
FIG. 1 is a front perspective view of a combination lamp in accordance with one embodiment of the present invention.

Certain exemplary embodiments of the present invention will now be described with reference to the drawings. In general, such embodiments relate to a combination lamp comprising one or more different sets of light sources, wherein one set of light sources can be activated independently from the other sets of light sources.

Referring to FIGS. 1-8, certain embodiments of a combination lamp 10, 30 can comprise a first lamp 100, 300 and a second lamp 200, 400 in a fixed relationship with each other. Whereas the embodiment of combination lamp 10 shown in FIGS. 1-4 comprises a generally round shape and the embodiment of combination lamp 30 shown in FIGS. 5-8 comprises a generally oval shape, it is to be understood that the combination lamp constructed in accordance with the invention can take on any shape as a matter of application specific to design choice.

As shown, first lamp 100, 300 can have a plurality of LEDs 101, 301 mounted on a first support 102, 302, preferably covered by a first lens 103, 303. Second lamp 200, 400 can comprise a plurality of LEDs 201, 401 mounted on a second support 202, 402, preferably covered by a second lens 203, 403. First lamp 100, 300 and second lamp 200, 400 can be constructed and arranged to be selectively removable from or permanently fixed to each other, as a matter of application specific to design choice. Preferably, first support 102, 302 connects to second support 202, 402 to secure the first lamp 100, 300 and second lamp 200, 400 together. Additionally, second support 202, 402 preferably includes a mounting element 210, 410 for mounting second lamp 200, 400 and preferably combination lamp 10, 30 onto a surface, such as on a vehicle.

Referring to FIGS. 1-4, in accordance with certain uses of the invention, such as outdoor use, especially on vehicles, it may be preferable for first support 102 to be permanently fixed to second support 202, to provide security. In accordance with one embodiment of the invention, second lamp 200 can be directly mounted on a surface, and first lamp 100 can be connected to second lamp 200 which can maintain first lamp 100 in place. One such embodiment includes a second lamp 200 that comprises a flange for mounting on the rear of a vehicle. Second lamp 200 can thus be secured to the vehicle, and first lamp 100 can be connected to second lamp 200 by way of non-limiting example, by being inserted into a receiving aperture in second lamp 200. In accordance with an embodiment of the invention, first lamp 100 can be inserted into the receiving aperture of second lamp 200 until it snaps into place, after which first lamp 100 cannot be removed.

Figure 2:
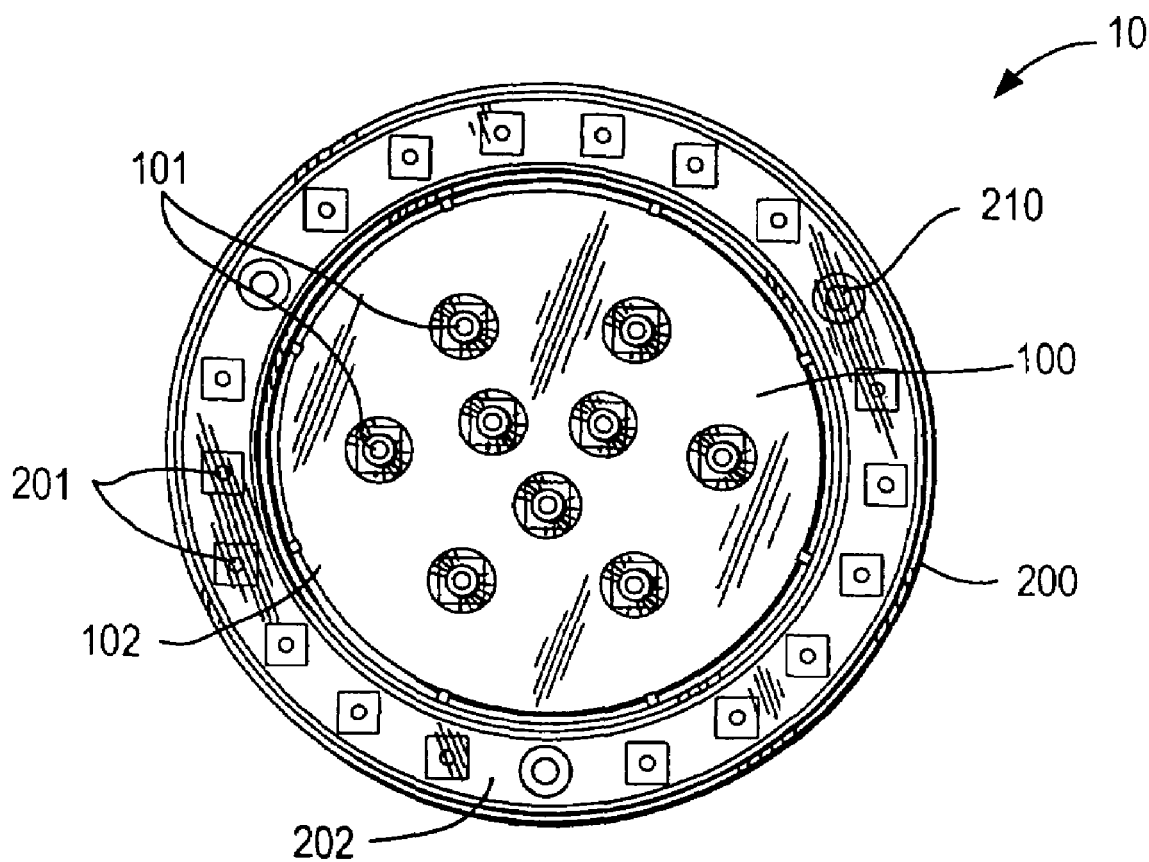
FIG. 2 is a top plan view of a combination lamp in accordance with one embodiment of the present invention.
Figure 4:
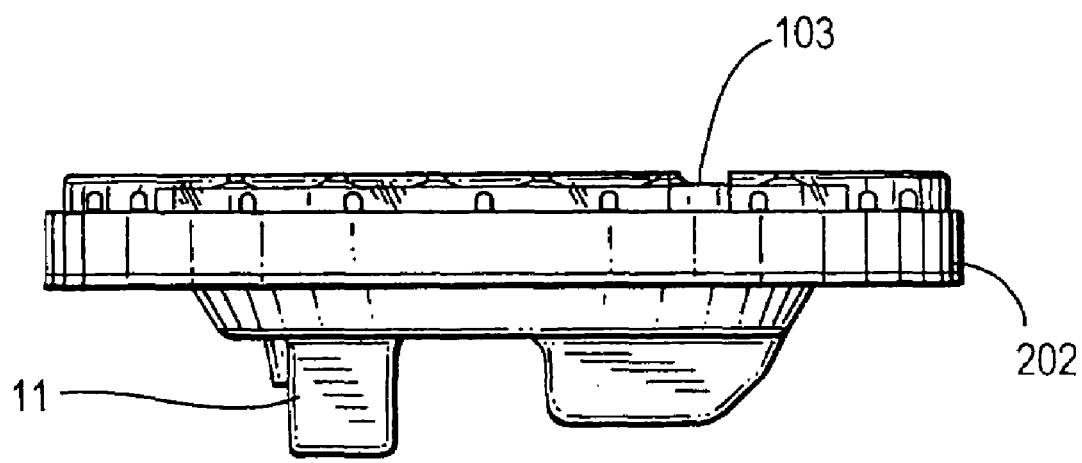
FIG. 4 is a side elevational view of a combination lamp in accordance with one embodiment of the present invention.
Figure 5:
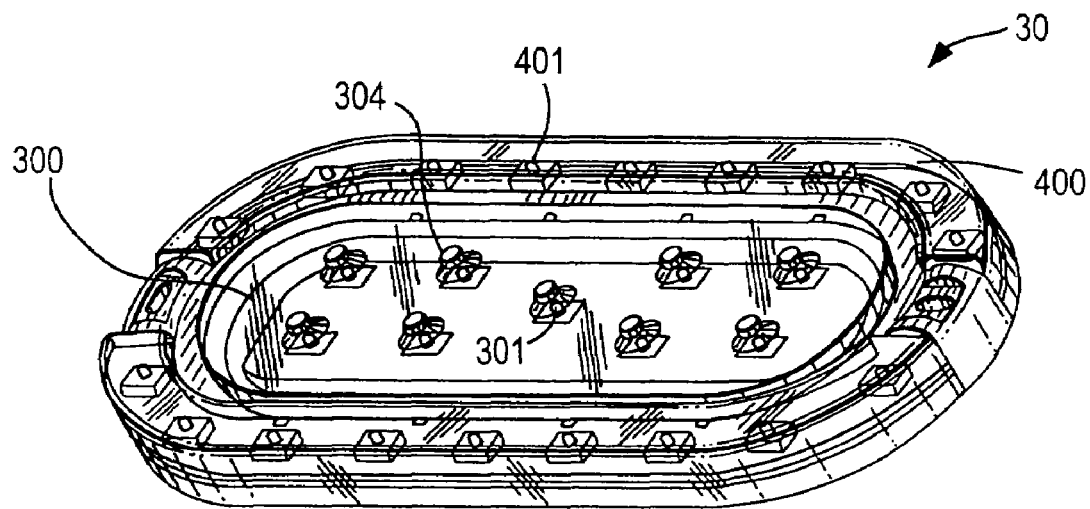
FIG. 5 is a front perspective view of a combination lamp in accordance with one embodiment of the present invention.

Alternatively, referring to FIG. 2 by way of non-limiting example, it may be desirable for first lamp 100 to be separable from second lamp 200. Such removability can facilitate quick and easy replacement of lamps 100 or parts thereof. For example, one can remove first lamp 100 from second lamp 200, replace the necessary LEDs, fix the circuitry, replace the lens, etc., whatever service is desired, then put first lamp 100 back in place. Alternatively, a replacement lamp can be put in place while first lamp 100 is serviced. Whereas first lamp 100 has been described as being inserted into and removed from second lamp 200, it is to be understood that second lamp 200 can be inserted into or removed from first lamp 100, without deviating from the scope of the invention.

The use of LEDs have been increasing recently, which may be partially because they can have an operating life of up to 100,000 hours before degradation commences. Therefore, an LED typically has greater operating life than a standard high-intensity incandescent bulb, which has a relatively short life span and is susceptible to damage. Furthermore, LEDs are commonly smaller in size than light bulbs, and provide more flexibility in positioning the LEDs. Therefore, it can be preferable for combination lamp 10 to comprise LEDs in both lamps 100, 200. When used on a vehicle, the illumination provided by the LEDs must meet the appropriate DOT (Department of Transportation) standards. For example, if combination lamp 10 includes an amber LED lamp as first lamp 100 and is to be used on the front of a vehicle, the amber LED lamp must meet the full turn compliance standard. Preferably, second lamp 200 meets the DRL (Daytime Running Light) standards, which would permit it to be used as a DRL lamp, which the DOT has encouraged as enhancing safety by elevating the visibility and noticeability of moving vehicles. Second lamp 200 need not meet the DRL standard, however, if it is being used for other purposes, such as for a decorative use.

Figure 6:
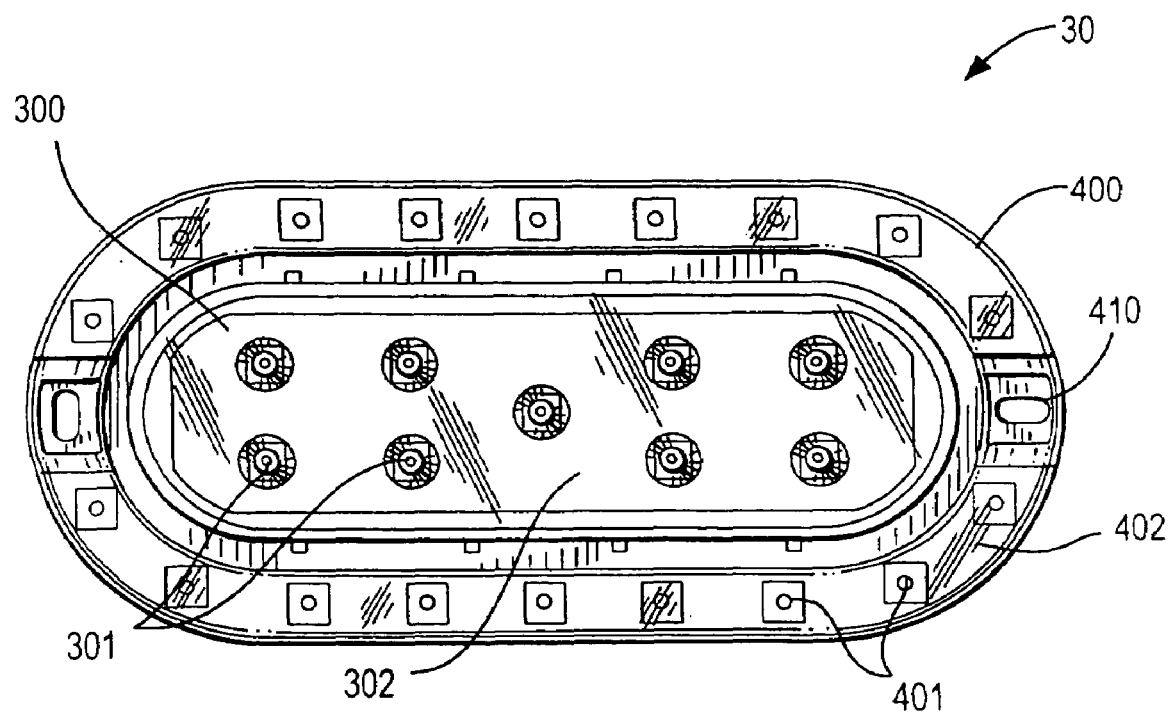
FIG. 6 is a top plan view of a combination lamp in accordance with one embodiment of the present invention.

Depending on the desired use of combination lamp 10, the number of LEDs per lamp 100, 200 can be varied. For example, whereas FIGS. 2 and 6 show certain embodiments of combination lamp 10, 30 wherein first lamp 100, 300 has nine or eight LEDs, respectively, and second lamp 200, 400 has eighteen LEDs, it is to be understood that the number of LEDs in each lamp can vary as a matter of application specific to design choice.

Figure 3:
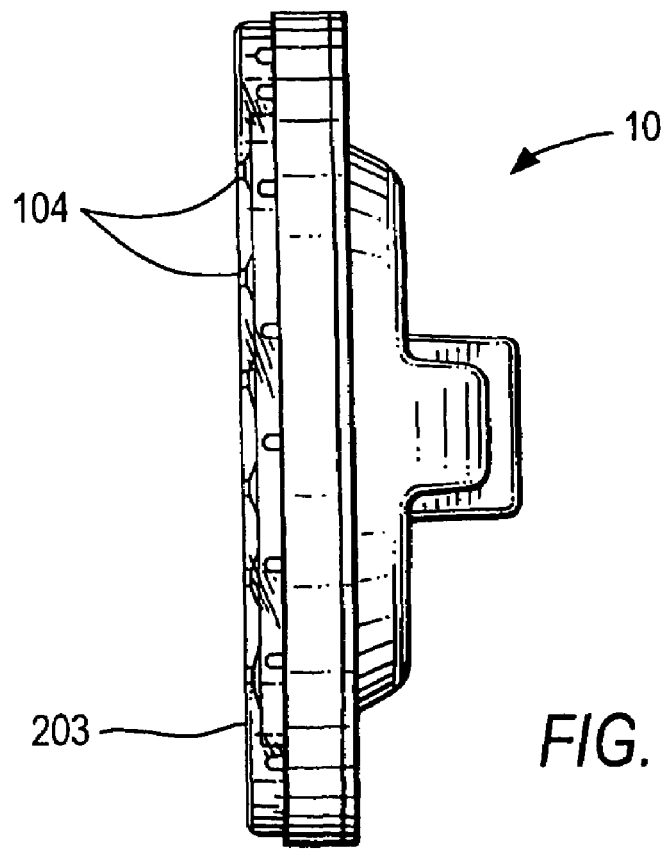
FIG. 3 is a side elevational view of a combination lamp in accordance with one embodiment of the present invention.
Figure 7:
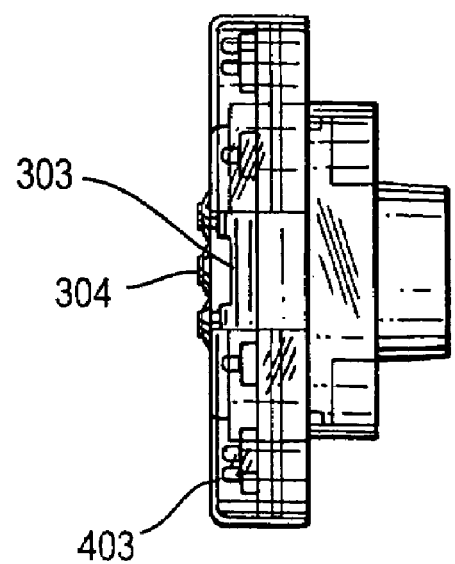
FIG. 7 is a side elevational view of a combination lamp in accordance with one embodiment of the present invention.

In accordance with the embodiments shown in FIGS. 3 and 7, first lamp 100, 300 comprises a plurality of projections 104, 304 on first lens located above LEDs 101, 301. These projections 104, 304 are preferably constructed and arranged to disperse light emitted from the LED below it, for example, by changing the direction of the emitted light. Whereas FIGS. 3 and 7 show second lamp 200, 400 without projections, it is to be understood that second lamp 200, 400 can also include projections, which can be similar or different from projections 104, 304 of first lamp 100, 300. Combination lamp 10, 30 can have any combination of lamps having projections, and first lamp 100, 300 and second lamp 200, 400 can have any number of projections without deviating from the scope of the invention.

Figure 8:
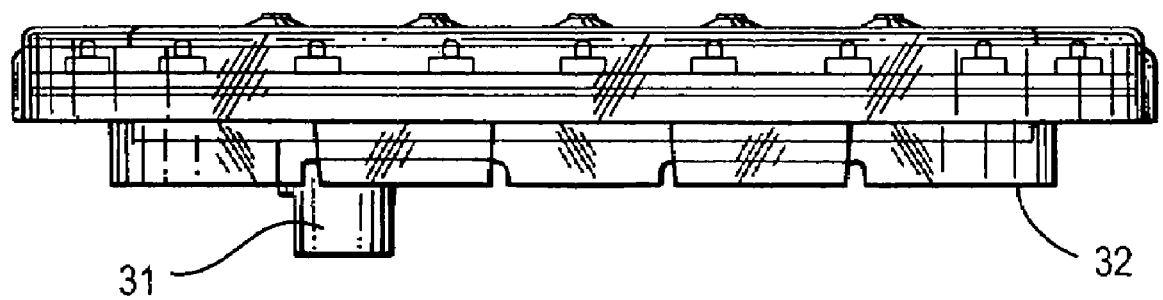
FIG. 8 is a side elevational view of a combination lamp in accordance with one embodiment of the present invention.

In accordance with an embodiment of the invention, as illustrated in FIG. 8, each lamp 300, 400 has its own power connection, 31, 32, such as a plug, outlet, or any mechanism for connecting to a power source. Power connections 31, 32 can either connect to the same or separate power sources. Accordingly, each lamp 300, 400 can be turned on or off or otherwise controlled independently of one another. For example, if combination lamp 30 as shown in FIGS. 5-8 is used on a vehicle, wherein first lamp 300 is a stop/tail/turn lamp and second lamp 400 is a back-up lamp, first lamp 300 will light up when the driver of the vehicle signals or stops, while second lamp 400 can remain off. On the other hand, when the driver backs up, first lamp 300 can remain off while second lamp 400 is lit. Alternatively, first lamp 300 can be a back-up lamp and second lamp 400 could be a stop/tail/turn lamp without deviating from the scope of the invention.

When used in a vehicle, it can be preferable for each first lamp 300 and second lamp 400 to be connected to the power source via separate cables. For example, the vehicles can have two cords for each lamp aperture or mount on which a combination lamp can be mounted. However, it is possible for one cord to be provided for each aperture/mount, wherein the power from each cord is split with a splitter or similar component, ends of the splitter being connected to one of the first connection of first lamp 300 or the second connection of second lamp 400. This is particularly suitable for vehicles that were built to house only one lamp in each aperture/mount.

One potential benefit in using a combination lamp in accordance with the invention with vehicles is that more light can be provided. For example, because the combination lamp 10, 30 occupies only one aperture/mount that one conventional stop/tail/turn or back-up lamp would occupy on the rear of the vehicle, one aperture/mount becomes free. One possible use of the freed aperture/mount is to mount an additional combination lamp, thus providing a total of four stop/tail/turn lamps and four back-up lamps while occupying the same space as two of each of the conventional lamps. Therefore, the illumination provided for each action of braking, signaling to turn, backing-up, etc. can be doubled. Alternatively, a conventional stop/tail/turn lamp or back-up lamp may be mounted in combination with combination lamp 10, thus providing extra illumination for specific actions.

Furthermore, combination lamp 10, 30 is preferably not significantly larger than a conventional stop/tail/turn or back-up lamp. For example, a conventional lamp for a vehicle, particularly trucks, is commonly mounted on a flange which is then mounted on the vehicle. Alternatively, a flange can be mounted first onto a vehicle, and a lamp can be subsequently mounted on the flange. Another embodiment provides a lamp that is integrally formed with a flange which is mounted on the vehicle. Thus in accordance with the conventional lamps, both a lamp and a mounting flange is required. According to an embodiment of the invention, the flange can comprise one of the lamp components of a combination lamp. For example, referring to FIG. 2, second lamp 200 can comprise a flange which is mounted on the vehicle. Therefore, no substantive structure is being added, and the space can be maximized.

In accordance with embodiments of the invention as shown in FIGS. 1-8, a combination lamp 10, 30 preferably includes at least two sets of light sources, one of which surrounds the other. As shown, second lamp 200, 400 surrounds the perimeter of first lamp 100, 300. Such an arrangement can be particularly beneficial for use as a vehicle stop/tail/turn-back-up combination lamp or a DRL-amber combination lamp, thus maintaining the shape of the illumination consistent with standard stop/tail/turn, back-up or amber lamps, and more particularly, when applicable, maintaining the flange-lamp arrangement consistent with conventional flanges and lamps.

First lamp 100, 300 and second lamp 200, 400 of a combination lamp 10, 30 in accordance with an embodiment of the invention that is not mounted on a vehicle can also be connected to a common power source via a splitter or separate cords. Alternatively, first lamp 100, 300 and second lamp 200, 400 can be connected to different power sources entirely. Furthermore, second lamp 200, 400 need not surround first lamp 100, 300 but may be positioned side-by-side, intertwined, create a design, etc., without deviating from the scope of the invention, as a matter of application specific to design choice.

Another potential use of an embodiment of the invention include hallways, staircases, and the like, where it can be preferable to provide more than one type of illumination. For example, a dim light can remain on constantly, whereas a bright light can be turned on and off. In accordance with one embodiment, second lamp 200, 400 can provide a low, dim light, such as a night light, and have a light sensor and only turns on when there is insufficient light present in the area. The first lamp 100, 300 in contrast, can provide brighter illumination, but must be turned on and off by a user. By providing a combination lamp, the same area can be used for two different types and sources of light.

The examples provided are merely exemplary, as a matter of application specific to design choice, and should not be construed to limit the scope of the invention in any way.

Thus, while there have been shown and described and pointed out novel features of the present invention as applied to preferred embodiments thereof, it will be understood that various omissions and substitutions and changes in the form and details of the disclosed invention may be made by those skilled in the art without departing from the spirit of the invention. For example, combination lamp 10, 30 can comprise more than 2 lamps, can comprise a vehicle headlight, and furthermore need not be used with a vehicle, without deviating from the scope of the invention as a matter of application specific to design choice. The lamps can comprise various shapes and sizes, and further can be utilized at a variety of locations for a variety of functions without deviating from the scope of the invention as a matter of application specific to design choice. For example, referring to FIG. 2, a stop/tail/turn-back-up combination lamp can have a first lamp 100 which is a stop/tail/turn lamp and a second lamp 200 which is a back-up lamp, or vice versa. Likewise, a DRL-amber combination lamp can have a first lamp 100 which is an amber lamp and a second lamp which is a DRL lamp and vice versa, without deviating from the scope of the invention. Additionally, other alterations can be made, as a way of non-limiting example, varying the number of LEDs, altering the transparency of the lenses, the shape and size of the supports 102, 202, number, shape and/or size of projections 104, as a matter of application specific to design choice, without deviating from the scope of the invention. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall therebetween.

What is claimed is:

1. A combination lamp for a heavy duty vehicle comprising:
   a first lamp assembly having a plurality of LEDs that are mounted on a first support and covered by a first lens; and
   a second lamp assembly surrounding the first lamp assembly, having a plurality of LEDs that are mounted on a second support, the second support comprising a flange having at least two holes for mounting the combination lamp to the heavy duty vehicle, and each group of LEDs between each hole covered by a colorless lens,
   wherein the first support connects to the second support to secure the first lamp assembly and the second lamp assembly together,
   wherein the first lamp assembly and the second lamp assembly have separate power connections to connect to one or more power sources,
   wherein the first lens has an outer facing surface and at least two raised projections extending from the outer facing surface, each projection aligned with an LED,
   and wherein each projection comprises a flat top surface that extends across the projection substantially parallel to the support, and a plurality of sloping side surfaces each directing light in a different direction.

2. The lamp of claim 1, wherein the top surface of each projection is a magnifying surface for magnifying light being transmitted therethrough.

3. The lamp of claim 1, wherein the first lamp assembly is constructed and arranged to be a stop/tail/turn lamp.

4. The lamp of claim 1, wherein the second lamp assembly is constructed and arranged to be a back-up lamp.

5. The lamp of claim 1, wherein the first lamp assembly is constructed and arranged to be an amber lamp.

6. The lamp of claim 1, wherein the second lamp assembly is constructed and arranged to be a daytime running light lamp.

7. The lamp of claim 1, wherein the first lamp assembly and the second lamp assembly are connected to a common power source.

8. The lamp of claim 1, wherein the first support and the second support are permanently fixed to each other.

9. The lamp of claim 1, wherein the first support and the second support are selectively removable from each other.

10. The lamp of claim 1, wherein the colorless lens of the second lamp assembly has an outer facing surface and at least two raised projections extending from the outer facing surface, each projection aligned with an LED, wherein each projection comprises a flat top surface that extends across the projection substantially parallel to the support, and a plurality of sloping side surfaces each directing light in a different direction.

* * * * *